April 23, 1963   R. S. HOCH   3,086,592
CEMENT REVERSING OUT TOOL FOR CASINGLESS COMPLETIONS
Filed Jan. 25, 1960   3 Sheets-Sheet 1

INVENTOR.
R. S. HOCH
BY *Hudson and Young*
ATTORNEYS

April 23, 1963 — R. S. HOCH — 3,086,592
CEMENT REVERSING OUT TOOL FOR CASINGLESS COMPLETIONS
Filed Jan. 25, 1960 — 3 Sheets-Sheet 2

INVENTOR.
R.S. HOCH
BY Hudson & Young
ATTORNEYS

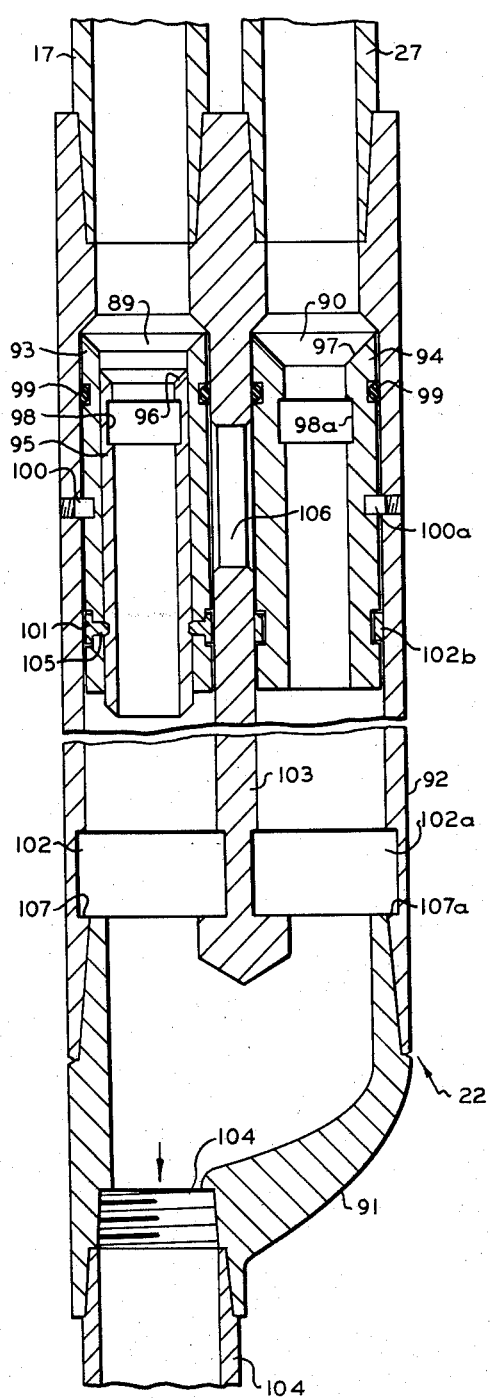
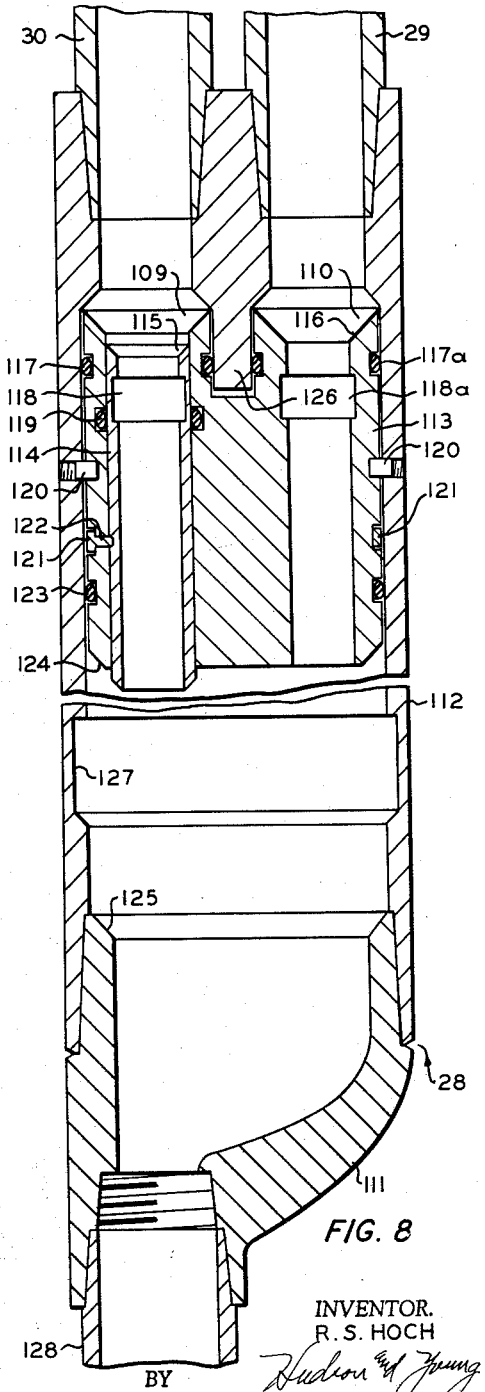
FIG. 7
FIG. 8
INVENTOR.
R. S. HOCH

United States Patent Office 3,086,592
Patented Apr. 23, 1963

3,086,592
CEMENT REVERSING OUT TOOL FOR CASING-
LESS COMPLETIONS
Robert S. Hoch, Bartlesville, Okla., assignor to Phillips
Petroleum Company, a corporation of Delaware
Filed Jan. 25, 1960, Ser. No. 4,537
10 Claims. (Cl. 166—224)

This invention relates to casingless, multiple completion deep wells. In one aspect it relates to completion of casingless deep wells for the production of fluid from two or more fluid-bearing horizons. In another aspect it relates to a cementing valve structure which will permit pumping cement downward through both tubing strings of a dual production well. In still another aspect it relates to a cementing valve structure which will permit pumping cement down all of the tubing strings and at the same time will permit opening of a communication port between the strings of tubing to permit washing of the tubing strings.

In casingless, multiple completion wells, to my knowledge, cement has been pumped down only one of the tubing strings. Pumping cement downward through long lengths of a single tubing string is a slow operation. Such pumping of cement for filling a borehole between one or more tubing strings and the walls of the well requires considerable power over long periods of time. According to this invention, cement can be pumped through two or more strings, thereby markedly shortening pumping time.

An important object of this invention is the provision of apparatus for the washing of cement from the inner surfaces of the tubing strings after cement has been pumped downward through two or more tubing strings. Another object of this invention is to provide apparatus for reducing the cost of completing multiple completion oil wells by shortening the length of time for carrying out the cementing operations. Another object of this invention is to provide apparatus for washing the interior of two or more tubing strings free of cement so as to maintain their original diameters for production of the fluid from several formations with minimum of pressure loss. Other objects and advantages will be realized upon reading the following description which, taken with the attached drawing, forms a part of this specification.

In the drawing,

FIGURES 7 and 8 are elevational views, in section, of still other embodiments of my invention.

Figure 1:
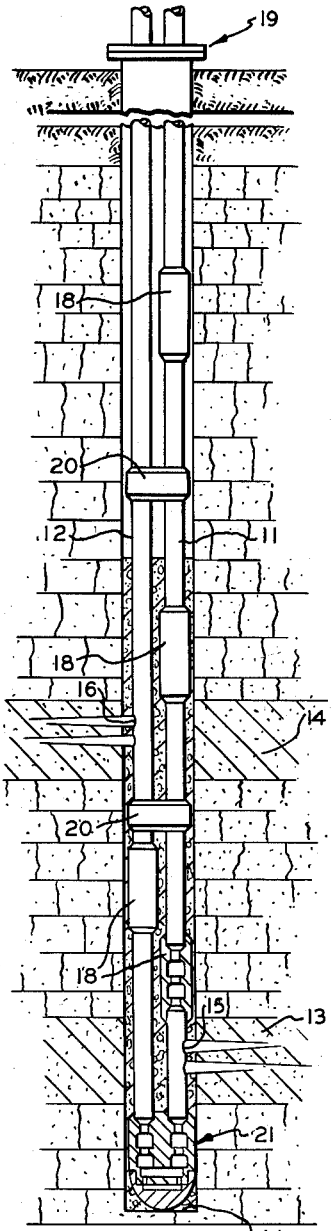
FIGURE 1 is an elevational view in section of a dual completion well in which the apparatus of this invention is employed.

Referring to the drawing, and specifically to FIGURE 1, there is illustrated a pair of tubing strings extending from a wellhead 19 to the bottom of a borehole 11a. These two tubing strings are identified by reference numerals 11 and 12. These strings terminate at the bottom of the well in a guide shoe-back pressure valve-reversing out tool 21 of this invention. In this particular embodiment fluid is intended to be produced from a lower formation 13 and from an upper formation 14 through perforations 15 and 16, respectively. A landing nipple 18 is provided in tubing string 11 at a level between the formations 13 and 14, as illustrated. If desired, a landing nipple 18 can also be installed between these formations in tubing string 12. In this manner production from either formation can be directed through either of the tubings as desired and the other tubing sealed off. For example, when production from formation 13 is desired through tubing 11, landing nipple 18 is installed in tubing 12 at a level between the two formations and a blanking plug, not shown, is installed in the nipple. The tubing 12 is then perforated adjacent the producing formation 14 for production therefrom. Nipple 18 with blanking plug in tubing 12 is positioned between the two formations for the purpose of preventing fluid from formation 13 from flowing downward in tubing 11, through the reversing out tool 21 and upward in tubing 12 to be mixed with fluid from formation 14. Likewise, the blanking plug in landing nipple 18 in tubing 12 prevents fluid flow from formation 14 in the reverse direction into tubing 11. Tubing clamps 20 are well known in the art and are employed to maintain the tubings in spaced relationship with one another while being run into the well and during the cementing operations. These tubing clamps are usually employed at predetermined intervals from the bottom of the well to the ground surface.

Figure 2:
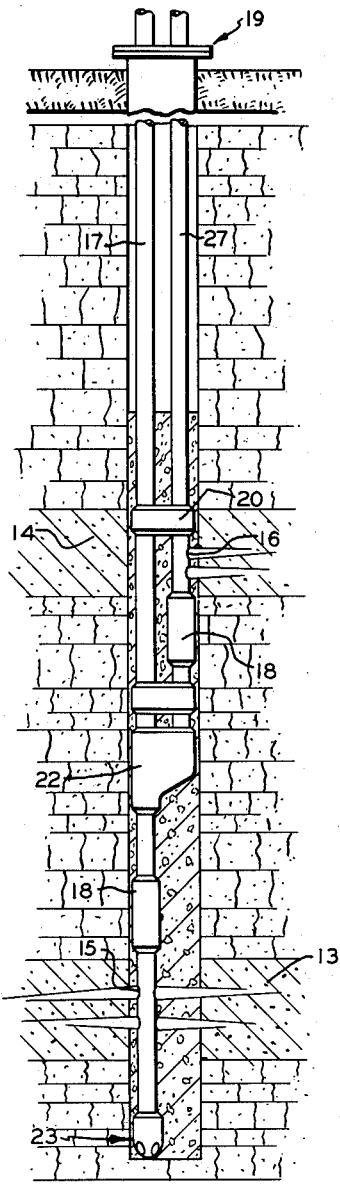
FIGURE 2 is an elevational view of apparatus illustrating another embodiment of my invention.

In FIGURE 2 is illustrated a well completion for a dual production well in which one tubing string reaches the bottom or substantially the bottom of the well and the other tubing string terminates at a level between the two oil-bearing formations. Tubing string 17 is the long tubing reaching the well bottom while tubing 27 is the short one terminating between the two formations. A circulating mandrel 22, shown in detail in FIGURE 7, connects the bottom of tubing string 27 with the tubing string 17. A landing nipple 18 is provided in tubing string 27 at a level between the two oil-bearing formations so that a blanking plug can be installed to prevent oil from formation 14 from mixing with oil from formation 13.

Figure 5:
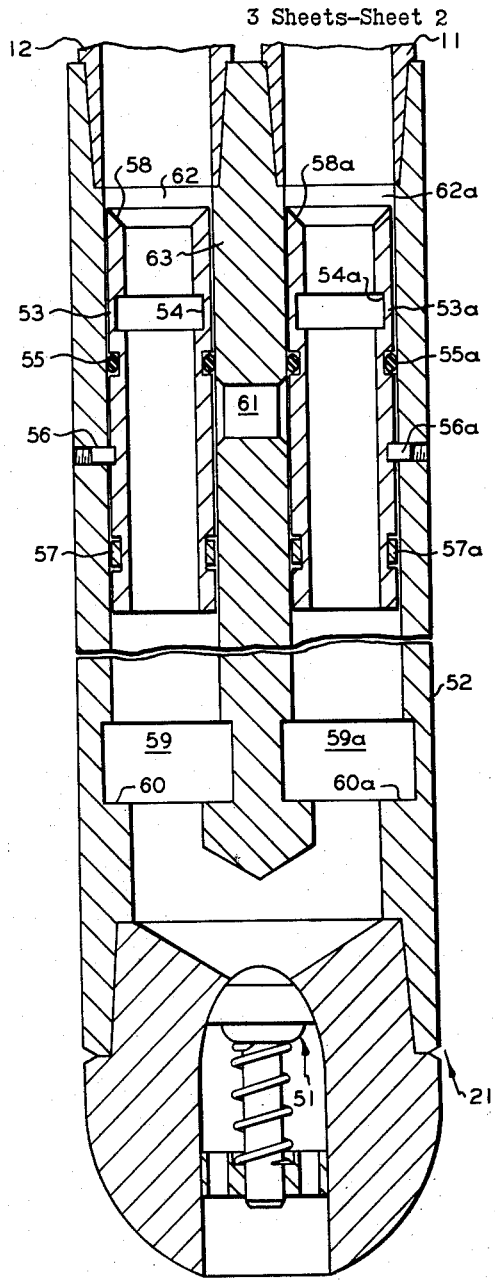
FIGURE 5 is an elevational view partly in section, of one embodiment of cement reversing tool of my invention.

A guide shoe containing a back pressure valve 51 attached to the lower end of reversing out tool 21, as illustrated in FIGURE 5, is suitable for use as the guide shoe and back pressure valve 23 of FIGURE 2.

Figure 3:
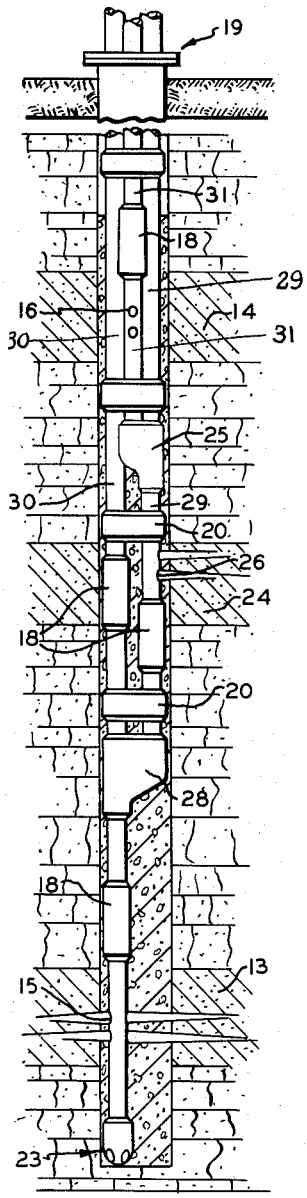
FIGURE 3 is an elevational view illustrating still another embodiment of my invention.

In FIGURE 3 is illustrated an installation of three strings of tubing such as are employed in a multiple completion well for production from three separate formations. A guide shoe and back pressure valve 23 is attached to the lower end of the longest string of tubing illustrated in FIGURES 2 and 3. In FIGURE 3 the tubing string 30 extends from the wellhead to substantially the bottom of the well, tubing string 29 extends to a level between the lower oil-bearing formation 13 and an intermediate oil-bearing formation 24. Tubing string 31 extends downward to a level between the intermediate formation 24 and the upper formation 14. A circulating mandrel 28, similar to mandrel 22 of FIGURE 2, connects the bottom end of tubing 29 with tubing 30 while a circulating mandrel 25 is connected with the bottom of tubing 31 and communicates with tubings 29 or 30 at a level between the upper and middle formations. Tubing 29 is perforated at 26 for production of fluid from formation 24. The mandrel 25 is constructed along the same lines as mandrels 22 and 28. Landing nipple 18 is installed in tubing 30 above mandrel 28 and formation 13 so that in case formation 13 is ever to be blanked off it can be done. A landing nipple is installed in tubing 29 at a level between formation 24 and the mandrel 28 to prevent mixing of fluids from formations 13 and 24. Similarly, a landing nipple 18 is installed in tubing 31 at an elevation above formation 14 in case production from formation 14 is ever to be blocked off. Additional landing nipples are installed in tubings 29 and 30 at an elevation between formations 24 and 14 so that, if desired, formation 14 can be produced to the exclusion of products from formations 24 and 13.

In the several figures as given herein, in a dual completion well the cementing pump outlet is manifolded to the two well tubings so that the pump will pump simultaneously into the tubings. In case of a triple completion well the cementing pump outlet is manifolded to the three tubing strings so as to pump simultaneously into the three tubing strings. If desired, more than one cementing pump can be used. In such a case the several pumps are manifolded to the several tubings.

FIGURE 5 illustrates one of the embodiments of the guide shoe-back pressure valve-reversing out tool of my invention. This tool comprises a spring-loaded back pressure valve 51 positioned in the lower portion of the apparatus. The purpose and operation of cementing back pressure valves is well understood by those skilled in the art. The valve is supported at the lower end of tubular housing 52 which incloses the remainder of this apparatus. In the upper portion of housing 52 is disposed a pair of conduits 62 and 62a, positioned as illustrated. Within these conduits are positioned sleeves 53 and 53a which are held in position by shear pins 56 and 56a, respectively. Separating conduits 62 and 62a is a partition or wall 63 provided with an opening or port 61, as illustrated. At the upper ends of the walls of conduits 62 and 62a are provided threads or other means for attaching tubings 12 and 11. Recesses 54 and 54a are provided in sleeves 53 and 53a, respectively, as shown. Also, expansible snap rings 57 and 57a are provided, as shown. O-ring seals 55 and 55a prevent leakage between the sleeves and the walls of these conduits. Near the lower ends of conduits 62 and 62a are provided recesses 59 and 59a, respectively, the lower ends of which terminate as seats 60 and 60a. Seats 58 and 58a are provided for receiving in a fluid-tight manner a corresponding seating surface 44 from a cementing plug 41, as illustrated in FIGURE 4.

Figure 4:
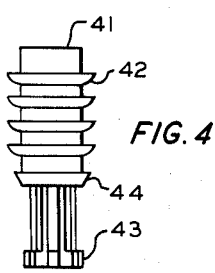
FIGURE 4 is an elevational view illustrating a piece of equipment useful with my invention.

This cementing plug illustrated in FIGURE 4 comprises flexible wiper rings or cups 42, seating surface 44 and collet lock members 43. Plug 41, when pumped down tubing 12, reaches the sleeve 53 with the collets 43 entering the recess 54, thereby locking the plug adjacent the sleeve.

In the operation of the apparatus of FIGURE 5, cement is pumped down both strings of tubings 11 and 12. When sufficient cement has been pumped into both strings, a separate cement plug, similar to plug 41, is released in each of the tubing strings simultaneously. While the plugs are released at the same time, they do not necessarily reach the sleeves 53 and 53a at the same time. For explanation purposes, when the plug in tubing 12 reaches the sleeve 53, fluid can no longer be pumped into tubing 12 and at this instant pump pressure increases. When the plug seats against seating surface 58 in sleeve 53, the increase of pressure differential causes shear pin 56 to shear, with the result that sleeve 53 moves downward until its lower end contacts shoulder 60 at which position the expansible snap ring 57 expands into recess 59 thereby locking sleeve 53 in its lowered position. The passage of sleeve 53 downward opens the adjacent end of port 61.

In due time the second plug reaches the lower end of tubing 11 and seats against seating surface 58a with the collets of the plug entering recess 54a, thereby locking this plug adjacent sleeve 53a. Continued pump pressure shears pin 56a after which action the sleeve moves downward until its lower end contacts seat 60a. The expansible ring 57a expands into recess 59a thereby locking this sleeve in this position. When sleeve 53a becomes lowered in this manner, its end of port 61 is opened thereby providing communication between tubings 11 and 12.

When the sleeves 53 and 53a are in these lowered positions, sufficient cement has been extruded around check valve 51 for cementing the well and, upon release of well head pressure, check valve 51 seats and the cement is allowed to set. However, while the cement around the tubings in the well bore is setting, drilling fluid or mud, or other liquid such as water, is circulated down one of the tubings through port 61 and up the other tubing to wash out any cement adhering to the walls of the tubings. When this washing out operation is completed, the washing liquid can be removed by displacing clean water, oil or a perforating fluid or may even be displaced with air or other gas and blanking plugs set in the landing nipples at the required levels. The tubings are then ready for perforations adjacent the formations and the well is ready for dual production.

Figure 6A:
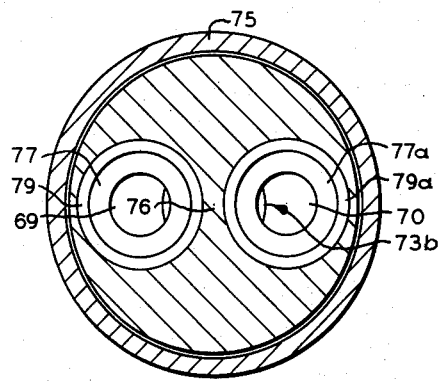
FIGURE 6a is a sectional view taken on the line 6a—6a of FIGURE 6.
Figure 6:
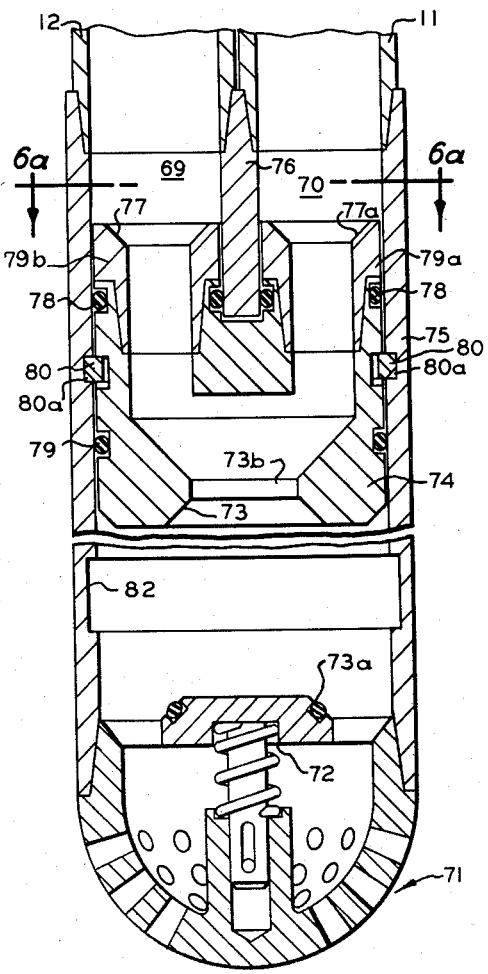
FIGURE 6 is an elevational view, partly in section, of another embodiment of cement reversing tool of my invention.

In FIGURE 6 tubings 11 and 12 are attached to the upper ends of the walls surrounding conduits 70 and 69, respectively, in the same manner as in FIGURE 5. A partition or wall 76 separates conduit 69 from 70 within housing 75 of this embodiment of the reversing out tool. A movable sleeve 74 is provided for downward movement within housing 75. O-rings 78 and 79 seal space between the sleeve 74 and the walls of housing 75 to prevent leakage of fluid therebetween. An expansible bevel snap ring 80 is provided as illustrated. This ring is provided, as its name implies, with a bevel surface 80a so that upon exerting a downward force on the ring in the position illustrated in the drawing, the ring contracts thereby allowing the sleeve to move downward. When the sleeve moves downward a sufficient distance, it expands into a recess 82 and locks the sleeve in place. When in this lower position with ring 80 locked into recess 82, a back pressure valve seat 73 at the bottom of the sleeve seats against the sealing surface 73a of a spring-loaded back pressure valve 72. A guide shoe of this embodiment, within which is a back pressure valve, is identified by reference numeral 71. At the upper ends of the sleeve 74 are provided seat members 79b and 79a on respective upper surfaces of which are beveled seats 77 and 77a for accommodation of cementing plugs similar to the plug of FIGURE 4.

In the operation of this embodiment of the apparatus the reversing out tool and guide shoe assembly are installed on the bottom of tubings 11 and 12 and the tubings are then run into the borehole. Cement is then pumped down tubings 11 and 12 until such time as it is believed that sufficient cement has been added; then cementing plugs are placed in the tubings and pressured downward by drilling fluid or other liquid. For explanation purposes, I will assume that the cementing plug reaches conduit 69 first and the plug seats against the seating surface 77. This point of operation is noted by an increase in pump pressure. Upon noting this increase of pump pressure the pumping rate is cut to about half or less so that the sleeve 74 will not move downward until after the second plug reaches the lower end of tubing 11 and seats against surface 77a. At this time pump pressure again increases and the bevel ring 80 contracts because of the bevel shoulder 80a, and the sleeve moves downward until the valve seat 73 reaches the upper sealing surface 73a of the back pressure valve 72. At this time conduit 69 communicates with conduit 70 below the lower end of wall 76. With this communication between the two tubings established, the interior walls of the tubings 11 and 12 are cleared of cement by circulation of water or other liquid down one tubing under the end of wall 76 and up the other tubing.

In FIGURE 6a seating members 79 and 79a with plug seating surfaces 77 and 77a, respectively, are shown. Opening 73b above the back pressure valve seat is seen.

In FIGURE 7 tubings 17 and 27 are illustrated as being attached to the upper end portion of housing 92. Conduits 89 and 90 communicate with the interior of tubings 17 and 27, respectively. Within conduit 89 is disposed a sleeve 93 provided with an O-ring seal 99, a shear pin 100, and an expansible snap ring 101. This snap ring is provided at spaced intervals around its inner surface with one or more pins 105 which extend into corresponding openings in the outer wall of an inner sleeve 95. This inner sleeve 95 is positioned within sleeve 93 as illustrated and it contains a recess 98. Below the lower end of sleeves 93 and 95 is provided a recess 102, the lower end of which is provided with a seating surface 107. A portion of this seating surface 107 is provided by the upper end of the shell or body member of circulating mandrel 22 which is threaded into the lower end of housing 92. An illustrated, the upper end of this circulating mandrel provides a seating surface of sufficiently small diameter for a purpose as subsequently described.

Conduit 90 within housing 92 is provided with a sleeve 94 which is held in position by a shear pin 100a, as illustrated. Shear pin 100a requires a smaller force for shearing than the above mentioned shear pin 100. An expansible ring 102b is provided for expanding into a recess 102a whenever sleeve 94 moves downward to such an extent that its lower end surface contacts seating surface 107a. A wall 103 divides conduit 89 from conduit 90 at the lower ends thereof. A port 106 is provided in wall 103 in such a position that when sleeves 93 and 94 are moved downward, the port provides communication from tubing 17 to tubing 27.

In the operation of this embodiment of this invention, when sufficient cement has been pumped into the two strings of tubing, a cementing plug is inserted into each tubing and the plugs are forced downward. One plug will land first because the rate of fluid entry into the two tubings is not necessarily the same. When the first plug lands, for example, on sleeve 93, the collets lock into recess 98 and the circulation pressure increases. The pump or pumps are slowed down to less than half their previous displacement rate in order not to shear pin 100. When the other plug reaches sleeve 94 the collets of this plug lock in recess 98a and liquid is trapped above both plugs and additional pumping will shear the weaker pin 100a first, and then the stronger pin 100. When pin 100a shears sleeve 94 moves downward until it reaches shoulder 107a. Snap ring 102b expands into recess 102a. Following this seating of slevee 94 with its plug, shear pin 100 shears and sleeves 93 and 95 move downward together. When snap ring 101 reaches recess 102 the ring expands and pins 105 move out of sleeve 95 and this sleeve is then freed for further downward movement. Upon downward movement of sleeve 95 in tubing 104, with its plug locked in place, the sleeve finally seats and the plug serves as a conventional cement plug. After sleeve 95 and its cementing plug have reached bottom in tubing 104, water or other liquid is circulated down one tubing string, 17 or 27, and up the other to wash out residual traces of cement. Communication between tubing 17 and 27 is by way of port 106 which was opened when sleeves 93 and 94 moved downward. A conventional cementing shoe and back pressure valve (not shown in FIG. 7) is provided at the bottom of tubing 104 similar to that illustrated in FIGURE 3.

In FIGURE 8 the embodiment illustrated resembles, to some extent, the apparatus of FIGURE 7 and also the apparatus of FIGURE 6. The fitting or housing 111 is similar to the corresponding part of fitting 91 of FIGURE 7, while the slidable member or sleeve 113 resembles somewhat sleeve 74 of FIGURE 6.

In FIGURE 8 conduits 109 and 110 are separated in the upper part of housing 112 by a wall 126. Below wall 126 and in the absence of slide 113, conduits 109 and 110 enter a single enlarged conduit. Slide 113 is provided with an O-ring seal 117 in conduit 109 and an O-ring seal 117a in conduit 110. Shear pins 120 and an expansible snap ring 121 are provided as shown. On the opposite side of the slide 113 the expansible ring 121 is shown without a pin 122. This pin 122 is intended to hold into position an inner sleeve 114, as illustrated. This inner sleeve is provided with a plug seating surface 115 and a recess 118 for accommodation of collets from a cementing plug similar to the plug of FIGURE 4. The opposite side of slide 113, having conduit 110 therethrough, is provided with a recess 118a.

On the lower outer surface of slide 113 is a bevel surface 124 for seating against a mating bevel surface 125, as illustrated. The operation of the apparatus of this figure is quite similar to the operation of the apparatus of FIGURE 7. If the cementing plug reaches conduit 109 through tubing 30 ahead of the plug in tubing 29, the collets then enter recess 118 and the plug seats against surface 115. At this time pump pressure increases and the pumping rate is reduced so that pins 120 will not be sheared. Upon continued pumping at this slower rate, the cementing plug from tubing 29 finally reaches conduit 110 and the collets enter recess 118a and the plug seats against surface 116. At this time pump pressure increases again and pins 120 shear thereby allowing the slide 113 to move downward until the bevel surface 124 contacts surface 125. During the downward movement of slide 113 the expansible ring 121 reaches recess 127 and expands thereinto to such an extent that pin 122 free sleeve 114. When this sleeve has been freed, then upon continued exertion of pump pressure, the plug forces sleeve 114 downward and into a lower tubing 128 corresponding to the lower portion of tubing 17 of FIGURE 2. Pumping is continued until sleeve 114 and its accompanying plug reach the guide shoe and back pressure valve 23, as illustrated in FIGURE 2. Tubing 30 and the tubing section 128 are thus freed of cement and upon release of pump pressure the back pressure valve within apparatus 23 seats to prevent inflow of cement from the well bore.

With the slide 113 having been moved downward, communication is provided between tubings 29 and 30 by way of an open space below the lower end of wall 126. All traces of cement are thus removed from the inner walls of tubings 29 and 30 by circulation of water, drilling fluid or other liquid. After the tubings are washed clean of cement and the cement has set in the space in the well bore between the tubings and the walls of the well, blanking plugs can be installed at the proper levels adjacent which are positioned landing nipples, and the tubings perforated at the proper levels. The well is then ready for production.

The length of wall 63, FIGURE 5, below port 61 is sufficiently long that when the bottom ends of slides 53 and 53a contact seating surfaces 60 and 60a the corresponding plugs are below port 61 so that there can be free and unobstructed flow through this port. The same condition is intended to exist below port 106 of FIGURE 7. In FIGURE 6 it is intended that sleeve 74 with plugs in contact with surfaces 77 and 77a move downward a sufficiently great distance to provide free and unobstructed flow path below the lower end of wall 76. The same condition is intended to exist in FIGURE 8 so as to provide an unobstructed and free flow path under the lower end of wall 126.

While certain embodiments of the invention have been described for illustrative purposes, the invention obviously is not limited thereto.

That which is claimed is:

1. A valve structure comprising, in combination, a body member having a pair of conduits the axes of which are vertically positioned, a third conduit communicating the conduits of said pair of conduits with each other, a slidable sleeve member in each conduit of said pair of conduits and closing said third conduit, the upper end of each sleeve member having a surface for seating a valve, a separate valve plug in each conduit of said pair of conduits positioned above the sleeve members, the valve plugs being adapted to seat against the seating surfaces of the slide members thereby closing the conduits of said pair of conduits, the sleeve members being adapted upon exertion of downward pressure on the valve plugs to move downward thereby opening said third conduit.

2. A valve structure comprising, in combination, a body member having a pair of conduits the axes of which are vertically positioned, a third conduit communicating the conduits of said pair of conduits with each other, a slidable sleeve member in each conduit of said pair of conduits and closing said third conduit, the upper end of each sleeve member having a valve seating surface, the slidable sleeve members being adapted to slide downward to open thereby said third conduit.

3. A valve structure comprising, in combination, a body member having a pair of inlet conduits the axes of which are vertically positioned, a wall separating said conduits from each other, and a third and outlet conduit in communication with the inlet conduits, a fourth conduit in said wall communicating the conduits of said pair of conduits with each other, a slidable sleeve member in each inlet conduit adjacent said fourth conduit closing same, the upper end of each sleeve member having a surface for seating a valve, a separate valve plug in each conduit of said pair of conduits positioned above the sleeve members and in fluid-tight relation with the seating surfaces, the sleeve members being adapted to move downward upon exertion of fluid pressure downward upon the valve plugs thereby opening said fourth conduit.

4. In the structure of claim 3, a back pressure valve in said third conduit.

5. A valve structure comprising, in combination, a body member having a pair of inlet conduits the axes of which are vertically positioned, a wall separating said conduits from each other, a third and outlet conduit in communication with the inlet conduits, a fourth conduit in said wall communicating the conduits of said pair of conduits with each other, a slidable sleeve in each inlet conduit adjacent said fourth conduit closing same, the upper end of each sleeve having a surface for seating a valve, a separate valve plug in each conduit of said pair of conduits above the sleeves, an annular shoulder in each inlet conduit below the lower end of the sleeve and facing the sleeve for limiting downward movement thereof, the shoulders being so positioned in the inlet conduits to permit the sleeves to move downward upon exertion of fluid pressure downward upon the valve plugs thereby opening said fourth conduit and a back pressure valve in said third conduit.

6. A valve structure comprising, in combination, a body member having first and second inlet conduits the axes of which are vertically positioned, a wall separating said inlet conduits from one another, a third and outlet conduit in communication with the inlet conduits, said third conduit being positioned along the axis of said first conduit, a fourth conduit in the wall providing communication between said first and second conduits, first and second slidable sleeves in said first and second conduits respectively, said slidable sleeves being positioned adjacent said fourth conduit thereby closing same, a third slidable sleeve within said first slidable sleeve, the upper ends of said second and third slidable sleeves having surfaces for seating valves, first and second valve plugs in said first and second conduits respectively, an annular shoulder in each inlet conduit below the lower ends of said sleeves and facing said sleeves, the inner diameter of the annular shoulder in said first inlet conduit being greater than the outer diameter of said third sleeve, a back pressure valve in said third conduit positioned remote from the adjacent ends of said inlet conduits, first and second valve plugs in the first and second conduits respectively, said plugs being adapted upon exertion of fluid pressure thereon to move said first and second sleeves downward adjacent the shoulders thereby opening said fourth conduit and further said first plug being adapted upon exertion of further fluid pressure thereon to move said third sleeve from said first sleeve and through said third conduit to said back pressure valve.

7. The valve structure of claim 6 wherein said valve plug are cementing plugs adapted to swab tubing surfaces.

8. A valve structure comprising, in combination, a body member having first and second inlet conduits the axes of which are vertically positioned, a wall separating said inlet conduits from one another, a third and outlet conduit in communication with the inlet conduit, the axis of said third conduit being intermediate the axes of the first and second conduits, a fourth conduit in the wall providing communication between said first and second conduits, first and second slidable sleeves in said first and second conduits respectively, said slidable sleeves being positioned adjacent said fourth conduit thereby closing same, the upper ends of said first and second slidable slidable sleeves having surfaces for seating valves, first and second valve plugs in said first and second conduits respectively, an annular shoulder in each inlet conduit below the lower ends of said sleeves and facing said sleeves, a back pressure valve in said third conduit positioned remote from the adjacent ends of said inlet conduit, first and second valve plugs in the first and second conduits respectively, said plugs being adapted upon exertion of fluid pressure thereon to seat against and to move said first and second sleeves downward against said shoulders thereby opening said fourth conduit thereby providing said communication between said first and second conduits.

9. The valve structure of claim 8 wherein said valve plugs are cementing plugs adapted to swab tubing surfaces.

10. A valve structure comprising, in combination, a body member having a pair of conduits the lower ends of which terminate therein and the axes of which are vertically positioned, a third conduit within said body member communicating with each conduit of said pair of conduits, a slidable sleeve member in each conduit of said pair of conduits, the upper end of each sleeve member having a valve seating surface, a separate valve plug in each conduit of said pair of conduits seated on the seating surface of each sleeve member, the slidable sleeve members in their inoperable positions being positioned in the conduits of said pair of conduits in such a manner as to close off communication of said third conduit with each conduit of said pair of conduits, pressure releasable means retaining said sleeve members in said inoperable position, said pressure releasable means being adapted to be released by exertion of fluid pressure downwardly on the valve plugs thereby forcing said slidable sleeve members to move downward resulting in opening of said third conduit to communication with conduits of said pair of conduits.

References Cited in the file of this patent

UNITED STATES PATENTS

| | | |
|---|---|---|
| 2,846,014 | Daffin et al. | Aug. 5, 1958 |
| 2,852,079 | Hebard | Sept. 16, 1958 |
| 2,923,357 | Daffin | Feb. 2, 1960 |
| 2,939,533 | Coberly | June 7, 1960 |